United States Patent [19]

Jeter

[11] Patent Number: 4,753,554
[45] Date of Patent: Jun. 28, 1988

[54] SUBMERGED FLEXIBLE PIPING SYSTEM WITH NEUTRAL BUOYANCY

[75] Inventor: Howard R. Jeter, Jacksonville, Fla.

[73] Assignee: Westinghouse Electric Corp., Pittsburgh, Pa.

[21] Appl. No.: 928,948

[22] Filed: Jul. 28, 1978

[51] Int. Cl.$^4$ .............. E02D 29/00; B63B 35/00
[52] U.S. Cl. .................. 405/195; 114/264; 138/155
[58] Field of Search ......... 405/158, 171, 195; 138/120, 123, 155, 121, 177, DIG. 9, DIG. 11; 141/382, 388; 114/264, 267; 166/350; 441/4, 133

[56] References Cited

U.S. PATENT DOCUMENTS

| 3,076,737 | 2/1963 | Roberts | 138/121 X |
|---|---|---|---|
| 3,467,013 | 9/1969 | Conner | 405/171 X |
| 3,469,601 | 9/1969 | Harper | 141/388 X |
| 3,573,348 | 4/1971 | Hermann | 441/133 x |
| 3,768,842 | 10/1973 | Ahlstone | 166/350 X |
| 3,841,357 | 10/1974 | Van Heijst | 138/120 |
| 3,847,184 | 11/1974 | God | 138/120 |
| 3,881,530 | 5/1975 | Faldi | 141/388 X |
| 3,884,528 | 5/1975 | Shaddock | 141/388 X |
| 4,116,009 | 9/1978 | Daubin | 114/264 |
| 4,120,168 | 10/1978 | Lamy | 405/171 X |
| 4,172,473 | 10/1979 | Lefere et al. | 138/155 X |

FOREIGN PATENT DOCUMENTS 746015 2/1933 France .

Primary Examiner—David H. Corbin
Attorney, Agent, or Firm—D. C. Abeles

[57] ABSTRACT

A submerged, self-supporting, flexible piping system for conducting fluids to and/or from a moored, floating vessel to a fixed location external of the vessel. Self-support is achieved by controlling the density of the piping walls to establish neutral buoyancy of the filled submerged piping system.

10 Claims, 2 Drawing Sheets

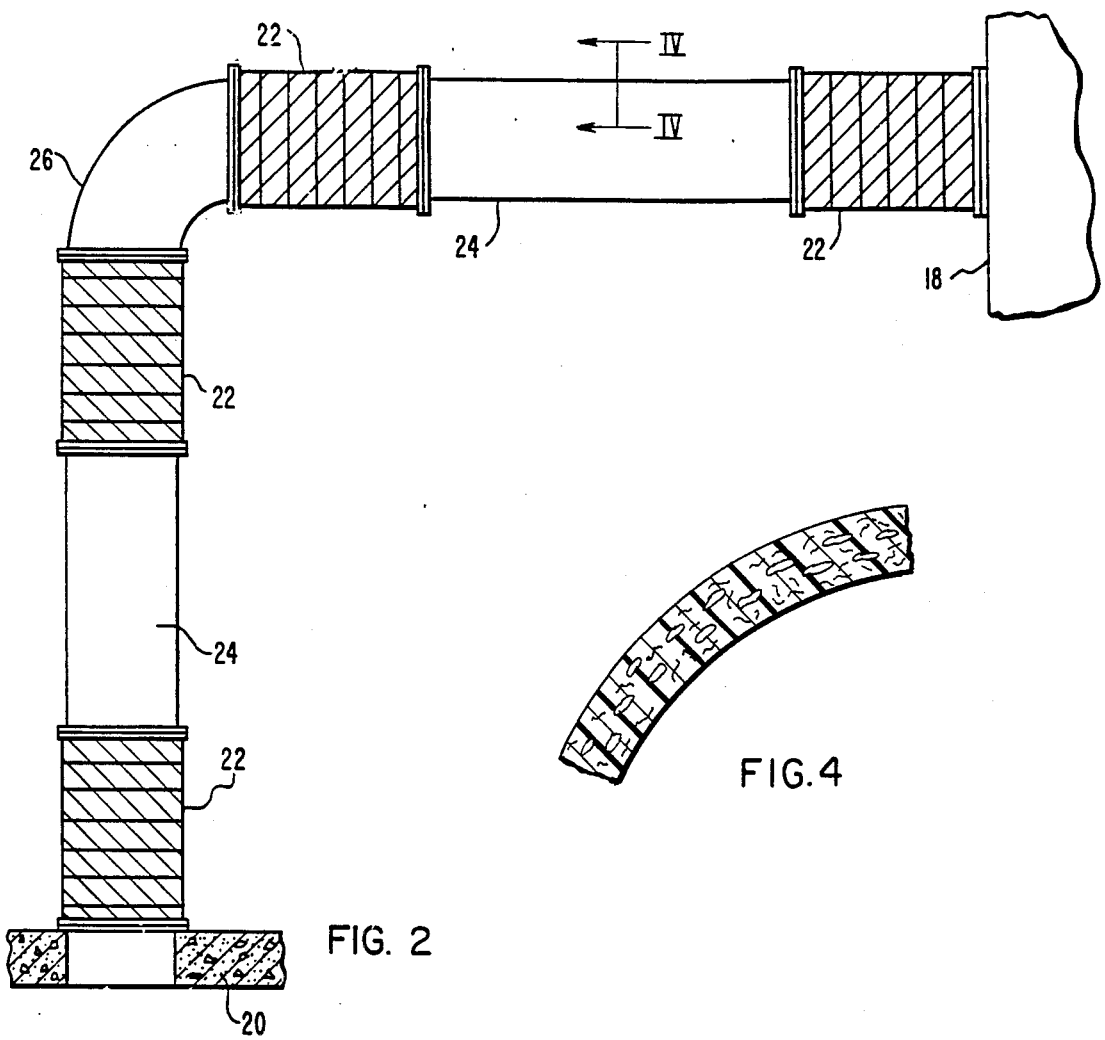
FIG. 2
FIG. 4
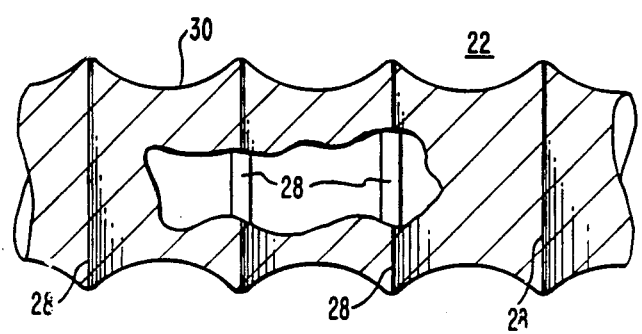
FIG. 3

SUBMERGED FLEXIBLE PIPING SYSTEM WITH NEUTRAL BUOYANCY

BACKGROUND OF THE INVENTION

This invention pertains generally to submerged fluid piping systems and more particularly to such systems that are coupled between a fixed, submerged location and a floating coupling.

The concept of offshore siting of nuclear power generating facilities has been considered for some time. The worsening trends in finding suitable land sites along the coast, power plant cost escalation and schedule delays, the growing concern of environmental impact of nuclear power generating stations and the desire for standardization to facilitate the licensing process have lent impetus to a serious consideration of offshore siting. In order to develop a floating nuclear plant, means for carrying cooling water from the plant condenser, which is employed to condense the turbine exhaust steam, to a location, in effect, "downstream" of the cooling water intake is required.

Since floating nuclear plants will be subject to large movements due to tide, wind and wave action, a device in the overboard coolant discharge piping system, which would permit this motion while at the same time carry the fluid, is required. Some additional constraints on the system require that it be leakage-free, not serve as an impediment to service barge traffic or the barge loading dock, and that such a system minimize pumping and maintenance requirements.

One proposed system employs a gooseneck piping arrangement with the outlet end submerged. However, analysis has shown this configuration presents high pump power requirements, large weight increases, unstable flow problems and support problems.

Accordingly, a new piping arrangement is desired for communicating the condenser coolant discharge to an external location downstream of the condenser inlet.

SUMMARY OF THE INVENTION

Briefly, this invention satisfies the aforestated requirements through a flexible, submerged piping system having neutral buoyancy. Neutral buoyancy is achieved by controlling the density of the submerged piping walls to establish weightlessness of the full system submerged in water. The neutral buoyancy of the system enables it to be self-supporting and the flexible arrangement accommodates barge motion.

BRIEF DESCRIPTION OF THE DRAWINGS

For a better understanding of the invention, reference may be had to the preferred embodiment, exemplary of the invention, shown in the accompanying drawings, in which:

FIG. 2 is a schematic illustration of the preferred embodiment of the piping system of this invention applied to the nuclear facility of FIG. 1;

FIG. 3 is a detailed schematic of the flexible couplings of the piping system of FIG. 2 with a portion thereof cut away for clarity;

FIG. 4 is a partial cross section, enlarged, of a portion of the pipe of FIG. 2, constructed from filament reinforced plastic, taken along the line IV—IV thereof.

DESCRIPTION OF THE PREFERRED EMBODIMENT

Figure 1:
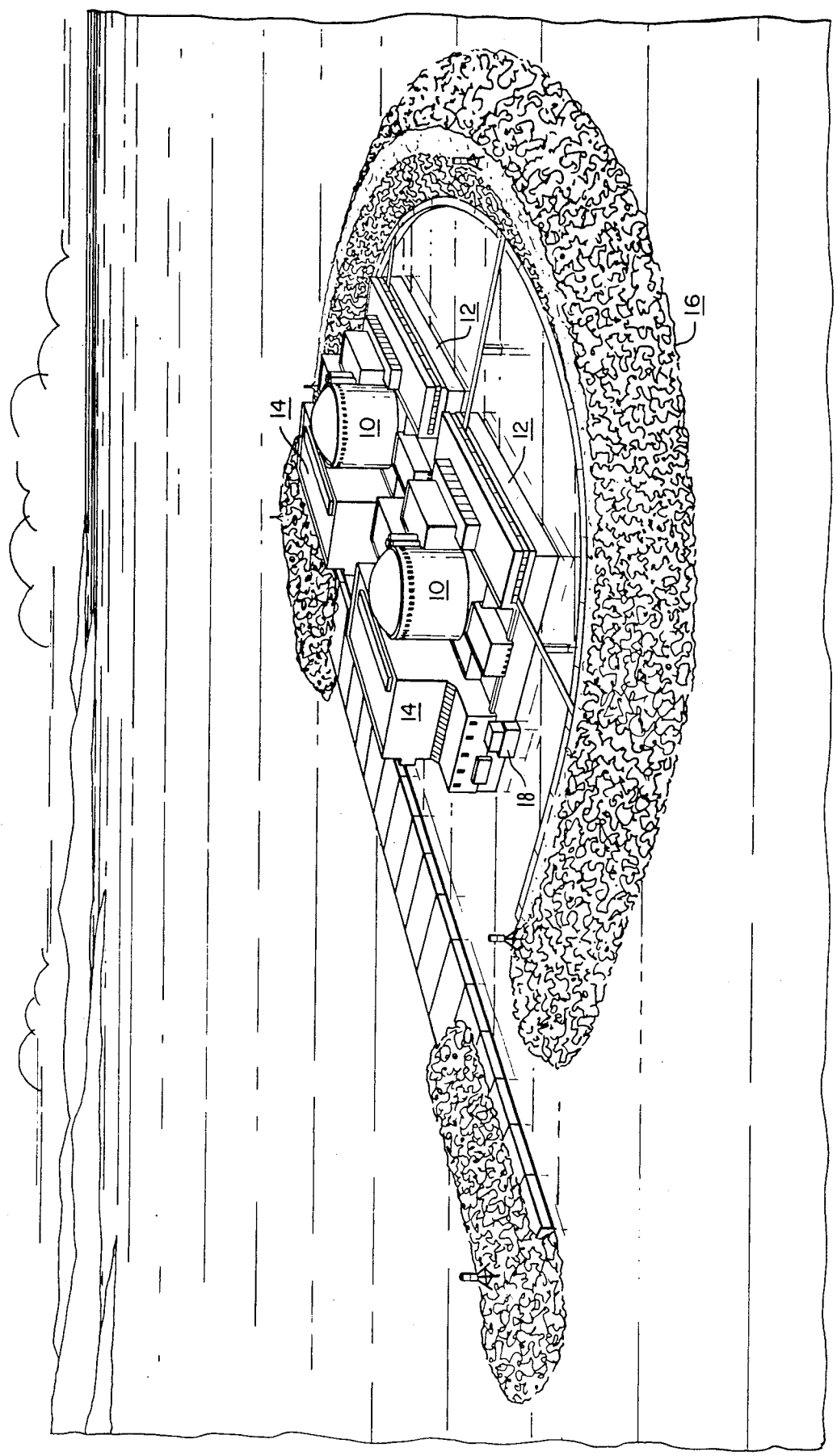
FIG. 1 is a perspective view of a floating nuclear facility employing the invention.

The basic concept of a floating nuclear power station has been previously described in application Ser. No. 856,064, filed Nov. 30, 1977 and a perspective view is illustrated in FIG. 1. As shown, the floating nuclear facility is a totally integrated power station mounted on a floating platform 12. The power station illustrated employs conventional pressurized water reactors with ice condenser containments 10 and turbine generator facilities 14. The perspective view of the facilities shown in FIG. 1 includes two power plant arrangements secured in mirror image relationship. At the offshor site a breakwater 16 surrounds and protects the plants and forms a basin in which the plants are moored. As previously pointed out, the station has to be designed to withstand the effects of relative motion of the operating components induced by environmental conditions such as four-foot waves. In such an arrangement the benefits that can be realized from this invention can be particularly appreciated since the invention permits rigid support of the condenser discharge piping on the ocean floor without placing undue stress on the piping system or its coupling to or through the barge platform 12. The condenser arrangement employed is more particularly described in the afore-cited application, but generally comprises a heat exchanger through which seawater is pumped and placed in heat exchange relationship with the exhaust steam from the turbine. The condensed steam exiting from the heat exchanger is returned to the feedwater side of a steam generator, while the exiting seawater coolant is discharged overboard downstream of the condenser intake; preferably outside of the breakwater.

The condenser coolant is discharged from the barge platform at a location 18 through the flexible piping system of this invention illustrated in FIGS. 2 and 3 to an underground discharge conduit 20. The conduit 20, as shown, is a cement casing anchored to the ocean floor, which directs the discharge stream outside of the breakwater a significant distance downstream of the condenser inlet.

The piping system of this invention shown in FIG. 1 comprises a number of rigid pipe sections coupled with short lengths of flexible pipe at each end. The embodiment illustrated includes three rigid sections 24 and 26 with flexible connecting sections 22. One of the rigid sections 26 is formed in an ell to create a right angle "dogleg". The flexible pipe sections 22 are fabricated to permit large deflections and rotations. For this purpose, short sections, preferably less than two diameters, of flexible pipe are used to provide stability. The rigid pipe is fabricated such that the weight of the assembly when filled and submerged in water is essentially zero. This weightlessness combined with the inherent stability of the system eliminates the need for additional supports. The only rigid supports shown are the couplings to the side of the barge 18 at the condenser outlet and to the discharge conduit 20.

The flexible sections 22 are desirably fabricated from rubber with individual metal bands or cables 28 formed concentrically, as opposed to spirally, and connected by 45 degree fabric plies as shown in FIG. 3. This configuration provides greater flexibility than more conventional hose designs.

Desirably the rigid pipe sections are fabricated in a manner to control the density of the pipe walls to establish the desired buoyancy. For example, filament reinforced plastic pipe with its density controlled to establish the desired buoyancy can be employed. Density control can be achieved by either incorporating a closed cell plastic foam in the pipe wall or by the use of syntactic foam, or hollow glass beads, or other void spaces in the pipe wall, as illustrated in FIG. 4 thereby reducing the pipe density to the desired value such that the weight of the entire assembly in water is essentially zero or slightly positive. Other pipe materials incorporating buoyancy augmentation either as an integral part of the pipe or attached to the pipe can be used to establish the weightless properties desired.

The resulting system is thus self-supporting, weightless in water, relatively inexpensive and allows large movements in all six degrees of motion.

I claim:

1. A fluid transport system comprising an elongated flexible pipe conduit submerged in a first fluid for transporting a second fluid therethrough from a first location to a second location spaced from and below said first location in said first fluid for discharge at said second location, the said flexible pipe conduit including a first generally horizontal rigid pipe section extending from said first location and a second generally vertical rigid pipe section extending to said second location and means interconnecting said generally horizontal and vertical rigid sections, said interconnecting means including means, joining said first and second sections, for maintaining the horizontal-vertical relationship between said sections and also including flexible connecting sections respectively between said first section and said maintaining means and between said maintaining means and said second section, the said pipe conduit having walls constructed to have a predetermined buoyancy substantially equal to the weight of the submerged pipe conduit filled with the second fluid.

2. The system of claim 1 wherein the maintaining means includes a rigid right-angle section joining the generally horizontal section to the generally vertical section.

3. The system of claim 1 wherein the flexible interconnecting sections are less than two diameters in length.

4. The system of claim 1 wherein the flexible connecting sections are formed from rubber with individual circular metal bands independently, concentrically positioned along the length of each said connecting section, each said band being connected to the said each interconnecting section by 45° fabric plies.

5. The system of claim 1 wherein the walls of the rigid sections are constructed to exhibit the predetermined buoyancy.

6. The system of claim 5 wherein the rigid sections are formed with void cavities in the pipe wall to control the pipe density and establish the predetermined buoyancy.

7. The system of claim 1 wherein the first location is on a floating moored offshore power generating station and the second location is a discharge conduit for the second fluid anchored to the ocean floor, one end of the flexible-pipe conduit being coupled to said discharge conduit and a second end of the flexible-pipe conduit being coupled to said floating moored station.

8. The system of claim 7 wherein the pipe has no external support coupling between discharge conduit and station coupling connections.

9. The system of claim 2 wherein the flexible connecting stations include separate flexible sections joining the generally horizontal rigid section and the first location and joining the generally horizontal rigid section and the rigid right-angle section and separate flexible sections joinging the generally vertical rigid section and the rigid right-angle section and joining the generally vertical section and the second section.

10. A fluid transport system comprising an elongated flexible pipe conduit submerged in a first fluid for transporting a second fluid therethrough from a first location to a second location spaced from the below said first location in said first fluid, the said flexible-pipe conduit including a first generally horizontal rigid pipe section extending from said first location and a second rigid pipe section extending to said second location and means interconnecting said first and second sections, said interconnecting means including a rigid member between said first section and said second section creating a "dog leg" between said first section and said second section, flexible connecting sections interposed in said first section and said second section, the said pipe conduit having walls constructed to have a predetermined buoyancy substantially equal to the weight of the submerged pipe conduit filled with said second fluid.

* * * * *